United States Patent [19]
Lee

[11] Patent Number: 5,442,962
[45] Date of Patent: Aug. 22, 1995

[54] CAPACITIVE PRESSURE SENSOR HAVING A PEDESTAL SUPPORTED ELECTRODE

[75] Inventor: Shih-Ying Lee, Lincoln, Mass.

[73] Assignee: Setra Systems, Inc., Acton, Mass.

[21] Appl. No.: 110,075

[22] Filed: Aug. 20, 1993

[51] Int. Cl.⁶ .............................................. G01L 9/12
[52] U.S. Cl. ...................................... 73/718; 73/724; 73/729.2; 361/283.3; 361/283.4
[58] Field of Search ................ 73/718, 724, 729.2, 73/731; 361/283.3, 283.4

[56] References Cited

U.S. PATENT DOCUMENTS

| | | |
|---|---|---|
| 4,084,438 | 4/1978 | Lee et al. |
| 4,136,603 | 1/1979 | Doyle, Jr. ........................ 73/278 X |
| 4,168,518 | 9/1979 | Lee . |
| 4,358,814 | 11/1982 | Lee et al. |
| 4,434,203 | 2/1984 | Briefer . |
| 4,735,090 | 4/1988 | Jeffrey et al. ...................... 73/706 |
| 5,150,275 | 9/1992 | Lee et al. |
| 5,155,653 | 10/1992 | Kremidas .......................... 73/718 X |

FOREIGN PATENT DOCUMENTS 2188155  9/1987  United Kingdom ................. 73/718

*Primary Examiner*—Richard E. Chilcot, Jr.
*Assistant Examiner*—Joseph L. Felber
*Attorney, Agent, or Firm*—Lappin & Kusmer

[57] ABSTRACT

A capacitance pressure sensor includes a conductive diaphragm positioned between two pneumatically separate chambers. The diaphragm is supported at its periphery by a concave base member. An electrode assembly establishes a substantially planar conductive surface opposite to, and spaced apart by a nominal gap from, the conductive diaphragm. The electrode assembly includes the conductive surface and a single support element secured to, and extending through the base member. A glass dielectric fixes the support element to a collar which may be welded, brazed or soldered to the base member. The glass dielectric provides both mechanical support and high quality electric insulation between the electrode and the housing. By prefabricating the electrode support element with the collar and securing the collar to the housing after the dielectric has cured, problems associated with thermal expansion and contraction are avoided and the dimension of the nominal gap may be precisely controlled at a relatively low cost.

55 Claims, 9 Drawing Sheets

CAPACITIVE PRESSURE SENSOR HAVING A PEDESTAL SUPPORTED ELECTRODE

BACKGROUND OF THE INVENTION

This invention relates to a pressure sensor and more particularly, a pressure sensor which relies on changes in capacitance to indicate pressure fluctuations.

Capacitive pressure sensors are well known in the prior art. Such sensors typically include a fixed element having a rigid, planar conductive surface forming one plate of a substantially parallel plate capacitor. A deformable conductive member, such as a metal foil diaphragm, forms the other plate of the capacitor. Generally, the diaphragm is edge-supported so that a central portion is substantially parallel to and opposite the fixed plate. Since the sensor generally has the form of a parallel plate capacitor, the characteristic capacitance of the sensor is inversely proportional to the gap, d, between central portion of the diaphragm and the conductive surface of the fixed element. In order for there to permit a pressure differential across the diaphragm, the region on one side of the diaphragm is sealed from the region on the opposite side.

In practice, the diaphragm elasticity is selected so that pressure differentials across the diaphragm in a particular range of interest cause displacements of the central portion of the diaphragm. These pressure differential-induced displacements result in corresponding variations in the gap, d, between the two capacitor plates, and thus in capacitance variations produced by the sensor capacitor. For relatively high sensitivity, such sensors require large changes of capacitance in response to relatively small gap changes. To achieve such sensitivity from unit to unit, nominal gap dimensions generally require that their component parts be manufactured to very close tolerances to establish the required dimensional relationships. In addition, the structure and materials must maintain those relationships over a useful temperature range.

In one form the prior art sensor, exemplified by the sensor of the Model 237 transducer manufactured by Setra Systems, Inc, assignee of the subject invention, a fixed metallic electrode is supported with respect to the diaphragm support member by means of an electrically non-conductive glass portion. Because of the differences in the thermal expansion coefficients between the glass portion, the metal electrode and diaphragm support member, temperature changes cause changes in the gap between the fixed electrode and diaphragm (i.e. the plates of the capacitor), such sensors give reliable pressure readings over a relatively small range of temperatures. In addition, the sensors have a relatively high manufacturing cost.

Moreover, during the manufacture of such sensors, the fixed electrode is generally set into the glass portion while the glass is in its molten state. As the assembly cools, mechanical stresses are set up which typically alter the desired initial gap dimension or degrade the parallelism between the capacitive plates. Following cooling of the assembly, the fixed electrode may need to be machined (e.g. by lapping or polishing) to re-establish the critical gap and parallelism. In view of these processing steps, such sensors are relatively difficult and correspondingly expensive to manufacture.

Another type of prior art sensor is disclosed in U.S. Pat. No. 4,358,814, assigned to the assignee of the subject invention. That prior art sensor, exemplified by the Models 264 and C264 transducer and transmitter, manufactured by Setra Systems, Inc., includes a cup-like, or concave, metal base member coupled to a base support at the center of the bottom of the base member. The base member includes a peripheral flange portion extending from its rim, where the flange is generally planar except for a circumferential depression. A relatively thin, deformable conductive diaphragm is disposed across the peripheral flange of the base member. A clamping ring having a surface which complements the flange of the base member is affixed to the edge of the diaphragm and the flange so that the diaphragm is clamped under tension to the flange.

An electrode assembly is affixed to the base support within the closed volume formed by the base member and diaphragm assembly. The electrode assembly includes a conductive electrode having a planar portion and a dielectric support member. The support member is connected to the base support so that the planar portion of the electrode is substantially parallel to and displaced by a predetermined distance d, from the flange of the base member. With this configuration, the diaphragm and the planar portion of the electrode form a parallel plate capacitor. Moreover, in response to pressure differentials, the diaphragm is displaced, resulting in corresponding changes in capacitance. Electrical connection to the capacitor may be provided by direct connection to the base member for one plate and a feed-through connection to the plate formed by the planar portion of the electrode.

The latter type of prior art sensor is effective in the measurement of pressure. Moreover, there are few high tolerance parts and complex assembly operations, with the only critical dimensional assembly operation being the initial alignment of the electrode with respect to the flange of the base member. Since this step only involves solid materials at room temperature, there are minimal mechanical stresses established. Moreover, since there are no glass-to-metal supports, there are no problems due to mis-match of temperature coefficients. Consequently, that prior art sensor provides a high sensitivity broad temperature range capacitance pressure sensor.

However, the latter type of prior art sensor has not been practical in certain segments of the market due to its relative complexity and relative high cost of manufacturing. Part of the high manufacturing cost is because of the necessity of controlling the thickness of the metallized electrode of that sensor and the dimensional tolerance of the main housing. The metallized electrode, which is generally supported on a ceramic disc, also represents significant cost. In addition, there is a need of an outside casing to house the sensor and the measurement circuit.

It is an object of the present invention to provide an improved pressure sensor.

Another object is to provide a high performance pressure sensor that is relatively inexpensive and easy to manufacture.

SUMMARY OF THE INVENTION

The present invention is an improved capacitance pressure sensor, adapted for high accuracy measurement of pressure using a low cost, easily assembled structure. The sensor includes a conductive diaphragm or a diaphragm having an electrically conductive portion, positioned between two pneumatically separate chambers. The diaphragm is supported at its periphery by a concave base member, defining one of the regions to be interior to the base member and bounded in part by a first side of the diaphragm. An electrode assembly is rigidly coupled to the base member and establishes a conductive surface opposite to, and uniformly spaced apart by a nominal gap from, the conductive diaphragm. The conductive surface is preferably planar, but may slightly differ, for example, being slightly concave to match anticipated maximum deflections of the diaphragm in use.

The electrode assembly includes an electrically conductive surface uniformly separated by gap, d, from the diaphragm. As used herein, the terms "uniformly separated" or "uniformly spaced apart" are defined as having a substantially constant distance between adjacent locations of two surfaces. Where the surfaces are substantially planar, they may also be considered substantially parallel. Where the surfaces are non-planar, they may be substantially complementary. In certain configurations, it may also be desirable for one or both surfaces to be discontinuous. For example the surface may have a hole or a portion spaced from the other surface by a distance greater than nominal gap, d.

The electrically conductive surface is supported by an electrode support element which extends substantially perpendicular to the electrically conductive surface. The electrode support element includes an electrically conductive portion which is electrically connected to the electrically conductive surface to transmit the capacitance value through the base member. The electrode support element is concentrically arranged with and fixedly attached to a cylindrical collar by a dielectric material such that the support element and therefore the electrically conductive surface are electrically insulated from the base member. By way of example, the dielectric material can be glass or epoxy. After the dielectric is hardened or cured, the collar is then fixedly attached to the base member to properly position the electrode with respect to the diaphragm by gluing, soldering or welding. Where a dielectric adhesive is used, a jumper wire may be provided to electrically connect the collar and the base member.

With this configuration, a capacitance detector circuit may be coupled between diaphragm and the electrode support, to permit measurement of the variation in capacitance as the diaphragm is displaced relative to the electrode due to variations in the pressure differential across the diaphragm.

In one embodiment, the electrically conductive surface of the electrode is hermetically sealed inside the chamber defined by the base member and the diaphragm. This permits the chamber to be evacuated, thus the sensor can be used to measure absolute pressure.

In an alternative embodiment, the upper housing may be replaced by elements similar to the base member and electrode assembly but facing the second side at the diaphragm, and including a second capacitance detection circuit. The latter configuration provides a push-pull sensing arrangement useful in otherwise conventional pressure sensors.

In an alternative embodiment, the upper housing may be replaced by an upper base member and electrode assembly, similar to the lower base member and electrode assembly but facing the lower base member without the diaphragm between them. In this embodiment, either or both base members may be substantially flexible and both electrodes are hermetically sealed in a single chamber formed by the upper and lower base members. When sealed, this configuration is useful in measuring absolute pressure, including, for example, barometric pressure.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
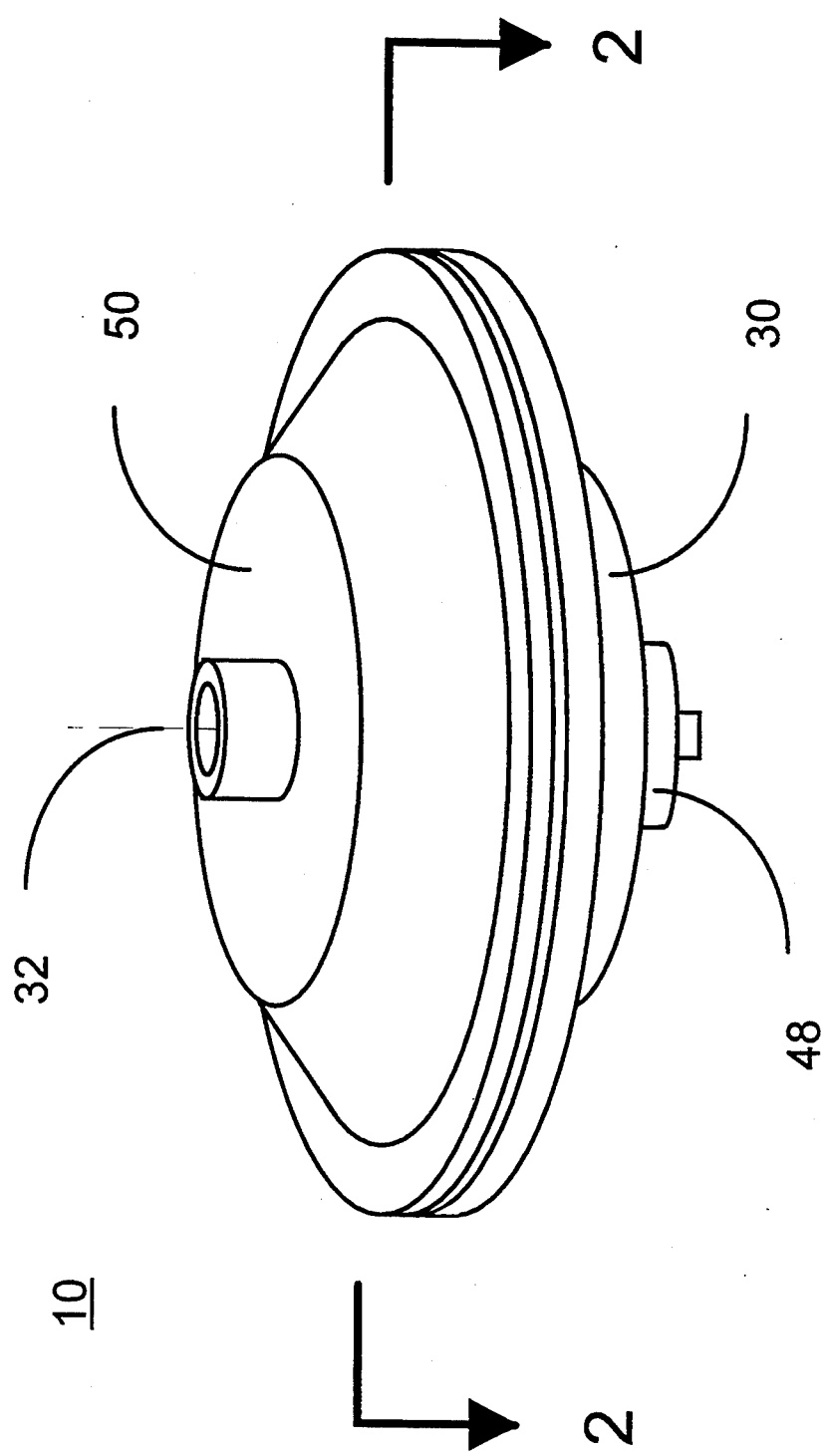
FIG. 1 shows in perspective a sensor in accordance with the present invention.

FIGS. 1 and 2A–2D show a capacitive sensor 10 which includes a concave or cup-shaped base member 30 having a annular peripheral rim 28 lying in a plane (indicated by broken line 15 in FIGS. 2A–2D) and extending symmetrically about a reference axis 32. A first opening 34 is provided to permit a portion of the electrode assembly 40 to extend through the base member 30. In the preferred embodiment, the base member is made of stamped sheet metal, preferably stainless steel, although other metals or alloys and constructions techniques may be used.

Figure 2A:
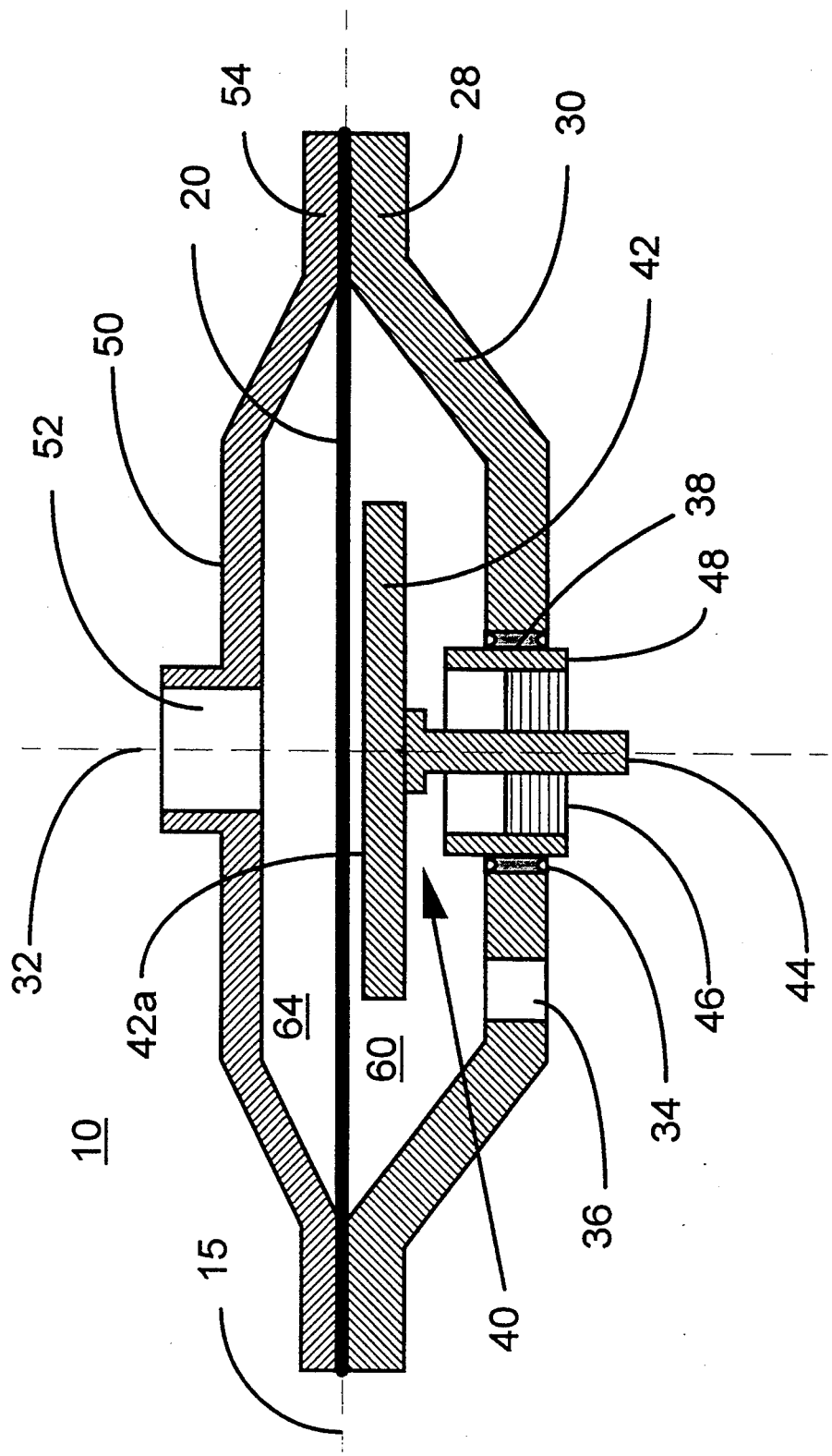
FIG. 2A shows a sectional view of one embodiment of the sensor of FIG. 1.
Figure 2B:
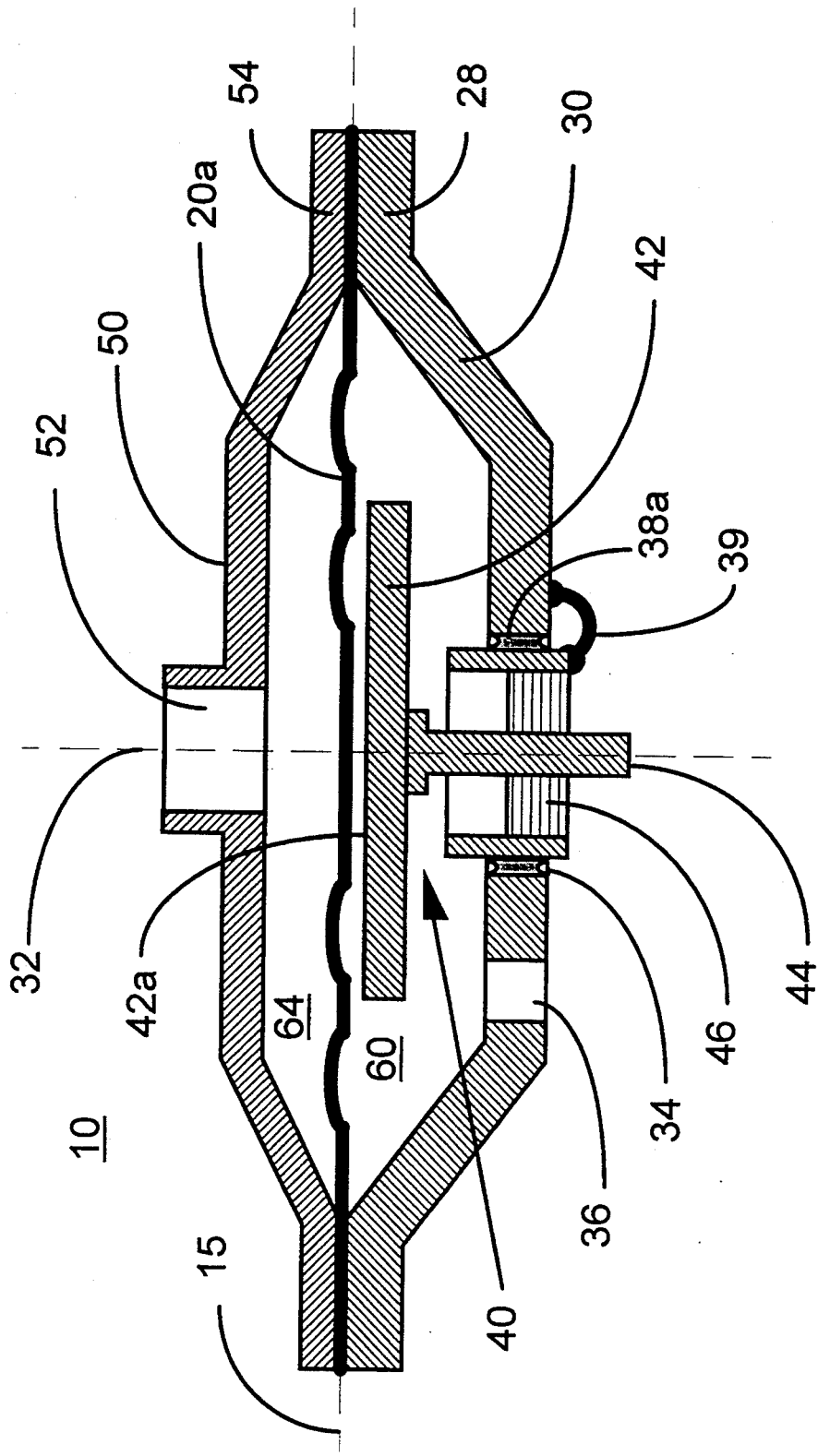
FIG. 2B shows a sectional view of an alternate embodiment of the sensor of FIG. 1.
Figure 2C:
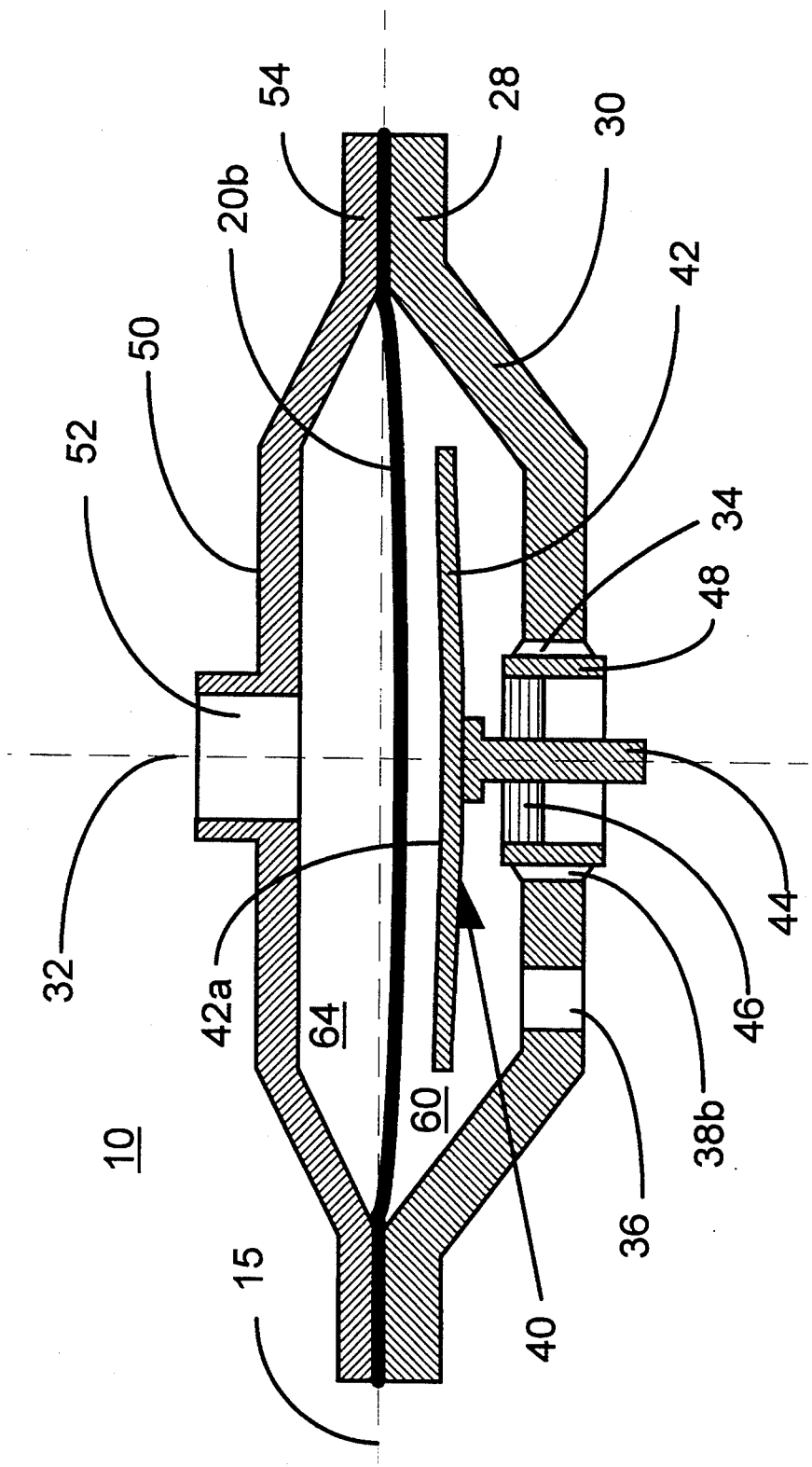
FIG. 2C shows a sectional view of a second alternate embodiment of the sensor of FIG. 1.

As shown in FIG. 2A, a relatively thin, deformable conductive diaphragm 20 stretches across the base member 30 so that its peripheral edge overlies the rim 28. In one form, the diaphragm 20 may be made of stainless steel, having a thickness in the range of 0.0002 to 0.030 inches. Alternatively, as shown in FIG. 2B, the diaphragm 20a may have ridges or wrinkles to permit greater linear motion. One form of such diaphragms is disclosed in U.S. Pat. No. 4,434,203, which is incorporated by reference herein. The diaphragm may be a metal foil, or a non-conductive material having a conductive portion, for example, established by a deposited conductive film. In an alternative embodiment, as shown in FIGS. 2B and 2C, the diaphragm may be non-planar.

A concave or cup-shaped housing 50 is positioned over the diaphragm 20. Housing 50 includes a pressure port 52 and a peripheral flange 54 that may be folded, crimped, or otherwise attached to the peripheral rim 28 of the base member in a manner capturing the peripheral edge of the diaphragm 20, with diaphragm 20 forming a substantially planar sheet, and providing an air tight seal at that edge. As a result, two distinct chambers of interest 60 and 64 are established; the first chamber 60 is below diaphragm 20 as shown in FIG. 2, and the second chamber 64 is above diaphragm 20 as shown in FIG. 2. The two chambers may be separately pressurized by couplings attached to pressure ports 36 and 52 to establish a pressure differential across diaphragm 20. The central portion of diaphragm 20 is movable in the direction of axis 32 in response to that pressure differential.

Figure 2D:
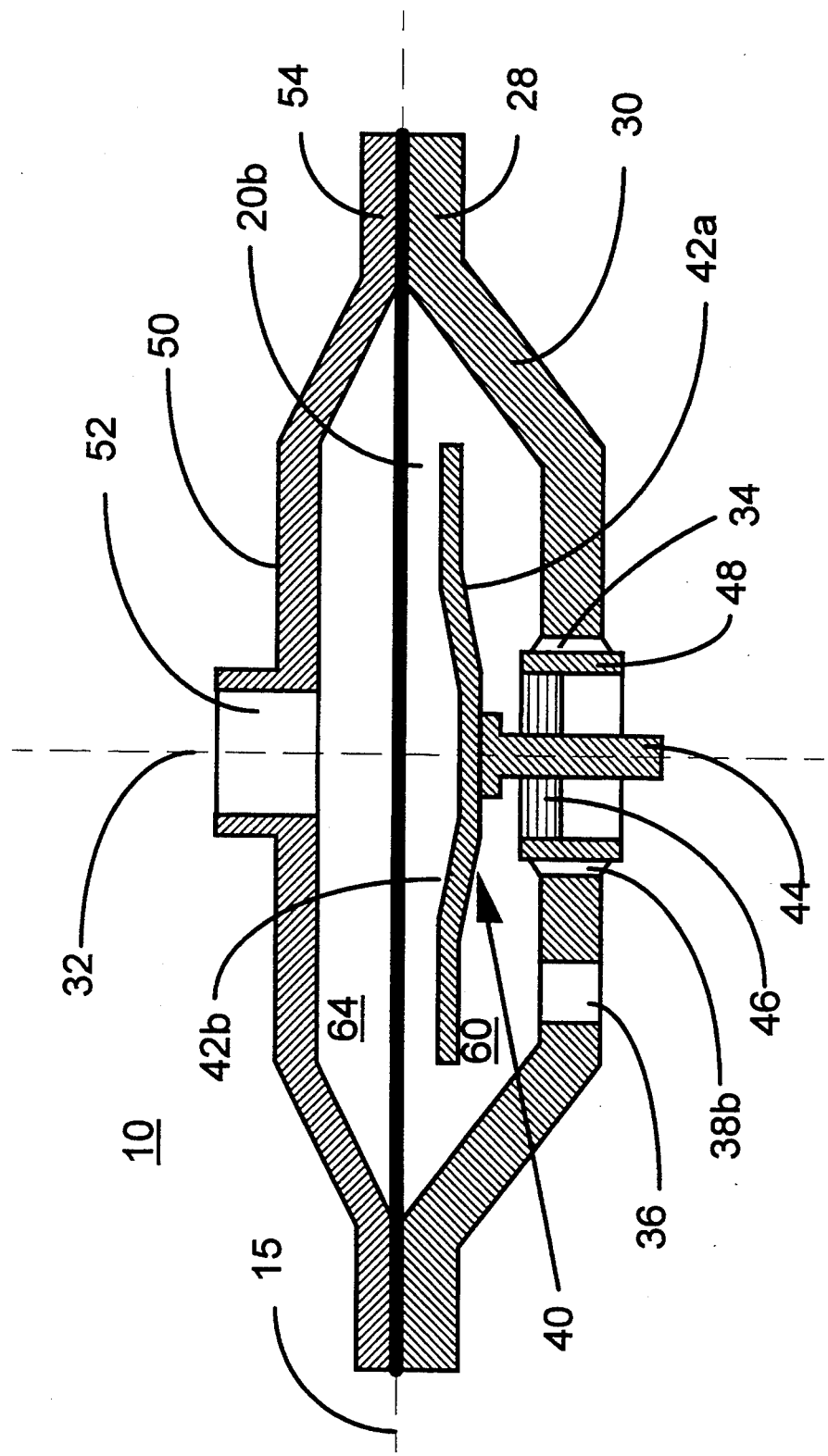
FIG. 2D shows a sectional view of a third alternate embodiment of the sensor of FIG. 1.
Figure 3B:
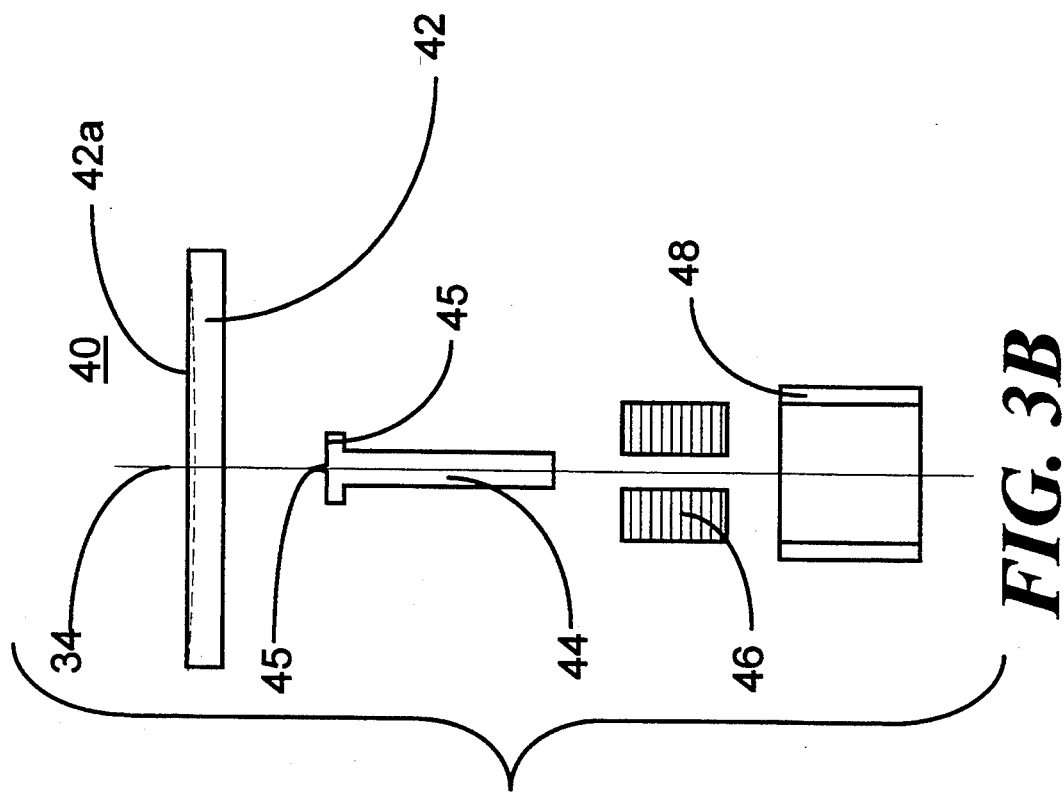
FIG. 3B shows an exploded view of the electrode assembly of FIG. 2.
Figure 3A:
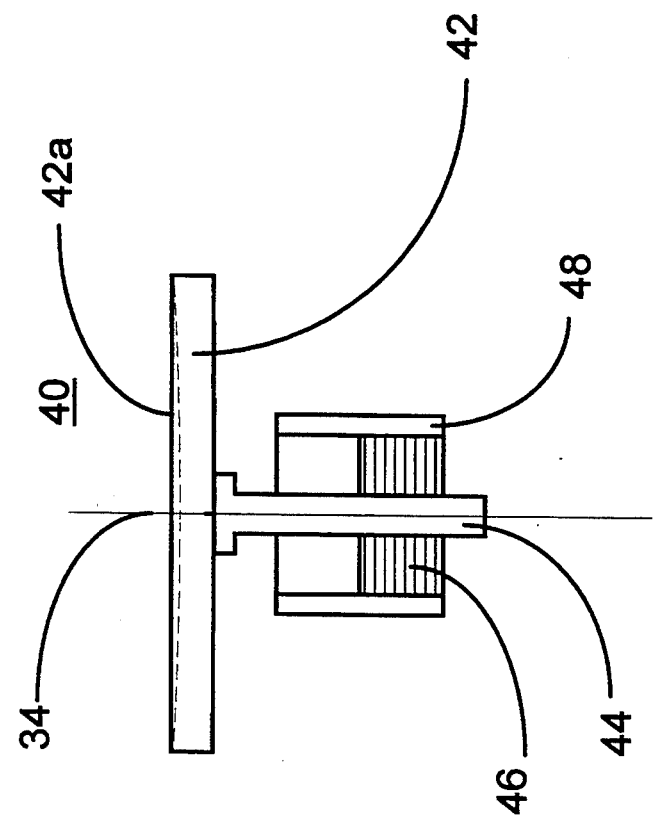
FIG. 3A shows a detail view of the electrode assembly of FIG. 2.

An electrode assembly 40 is positioned within chamber 60. As illustrated in FIGS. 3A and 3B, the electrode assembly 40 includes an electrode element 42, a support element 44, an insulating element 46 and a cylindrical collar 48. Electrode element 42 is preferably a metal-stamped, substantially planar disk, formed of stainless steel. Preferably, the electrode element 42 has a substantially planar top surface 42a, but in some forms of the invention that surface may be curved (as shown by the broke lines in FIGS. 3A and 3B) to match the curve or anticipated curve of the diaphragm 20 when deflected or deformed (for example, by a pressure differential), and still be within the meaning of the term 'substantially planar' as used herein. In other forms of the invention, the electrode element top surface 42a may be curved or otherwise formed complementary to the shape of the diaphragm as shown in FIGS. 2C and 2D. The planar recessed electrode element top surface 42b shown in FIG. 2D may also be used effectively with the curved diaphragm shown in FIG. 2C.

As shown in FIG. 3B, support element 44 is preferably a cylindrical pin, preferably of stainless steel, which may be provided with a flat head 43 and nib 45. Support element 44 not only holds the electrode element 42 in place within chamber 60 but also conducts the capacitance signal through to the outside of the base element 30. One end of support element 44 is securely attached to electrode element 42 for example by welding, soldering or brazing. In the preferred embodiment, the head 43 of the support element 44 is provided with a nib 45 to facilitate fusion welding of the support element 44 to the electrode element 42.

Initially, the support element 44 is attached to the electrode element 42, the other end is fixedly secured in concentric configuration with the cylindrical collar 48 by insulating element 46. In the preferred form of the invention, insulating element 46 is formed from a matched (to base member 30) temperature coefficient, dielectric bonding material (thereby electrically insulating electrode 42 from diaphragm 20) such as an epoxy, glass or plastic material which is hardened or cured in place thermally or through catalytic reaction, and is transformed from a fluid state to a solid state. After the insulating element 46 has fully cured, the cylindrical collar 48 is secured by gluing, welding, soldering or brazing to the base member 30.

As shown in FIGS. 2A–2D, the cylindrical collar 48 may be fastened to base member 30 in many different ways. First opening 34 is slightly larger than the diameter of the cylindrical collar 48 and the joint 38 is formed in the space between the base member 30 and the collar 48. As shown in FIG. 2A, the joint 38 is formed by soldering or brazing and thus the base member 30 and the cylindrical collar 48 are electrically connected. When the joint 38a (as shown in FIG. 2B) is formed by a dielectric material, such as an adhesive, a jumper wire 39 may be added to provide the electrical connection. FIGS. 2C and 2D show a weld joint 38b which may be formed for example by Tungsten Inert Gas (TIG) welding. This type joint is preferred in configurations requiring a hermetic seal.

In the preferred embodiment, the electrode assembly 40 and the base member 30 are first set in a fixture to establish the desired gap, d, and then the collar 48 is secured to base member 30. The combination of the insulating element 46 and the collar 48 provide the dual functions of positioning the electrode 42 precisely relative to the rim of the base member, as well as provide the required electrical insulation. By way of example, the insulating element 46 may be made of glass having a thermal expansion coefficient which is selected in view of the corresponding coefficient of elements 44 and 48, for example, to establish a compression seal, or if desired, a zero strain seal.

Under variable temperature conditions, the insulation material forming the insulating element 46 may cause minimum relative motion between the electrode and main housing. It is well known that the thermal coefficient of expansion for metallic material is often different substantially from that of a dielectric material. The configuration as described above minimizes the positional shift of the electrode support 44 relative to the base member 30. Under varying temperature conditions, the stress in the joint may change, but there will be substantially no net relative movement between the electrode support 44 and the base member 30.

The dielectric constant of the insulation material of insulating element 46 is preferably relatively insensitive to temperature and humidity. In one form of the invention, the insulation material incorporates particles of powder of certain stable dielectric materials, such as alumina powder. This powder filler controls the thermal properties of the joining material. It also reduces the moisture absorption of the bonding material.

The insulating element 46 forms a strong and stable bond between support element 44 and cylindrical collar 48, by virtue of the joint established between support element 44 and the tubular inner contour of collar 48. As a result, the electrode 42 and base member 30 form a very stable and rigid structure which resists effects of shock and vibration in all directions.

With the above described configuration, a capacitive pressure sensor is established, where the diaphragm 20 and the electrode element 42 effectively establish a "parallel" plate capacitor having a characteristic capacitance which varies inversely with d (which value is related to the pressure differential across the diaphragm 20).

Figure 5:
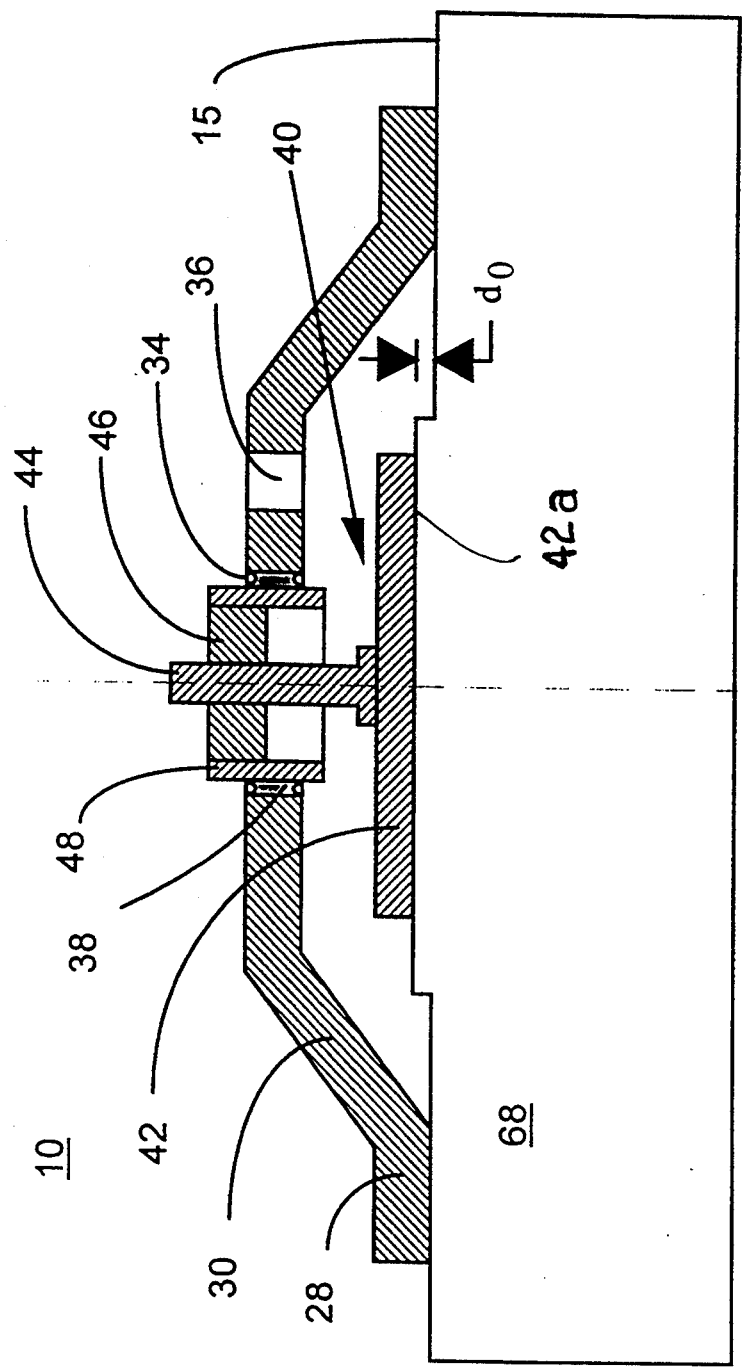
FIG. 5 shows a method of fabricating a sensor in accordance with the present invention.

In addition to the low piece count and simple structure of the above described embodiment of the invention, a further advantage is afforded because simple and low cost techniques may be used to assemble the sensor 10. More particularly, after separately forming elements 30 and 40, as shown in FIG. 5, the electrode assembly 40 may be placed with surface 42a facing downward on shims of thickness $d_O$ supported on a planar work surface 68 (where $d_O$ corresponds to the desired zero deflection separation of diaphragm 20 from surface 42a). Then, base member 30 may be inverted and placed over electrode assembly 40 with the end of electrode support 44 extending through the first opening 34 in the base member 30. The collar 48 is then bonded to the base member 30 and the combined electrode and base member configuration may be inverted and the diaphragm 20 may be fixed in place together with housing member 50 to complete the assembly, without need for special milling or finishing to restore the gap or parallelism of the electrode.

Figure 4A:
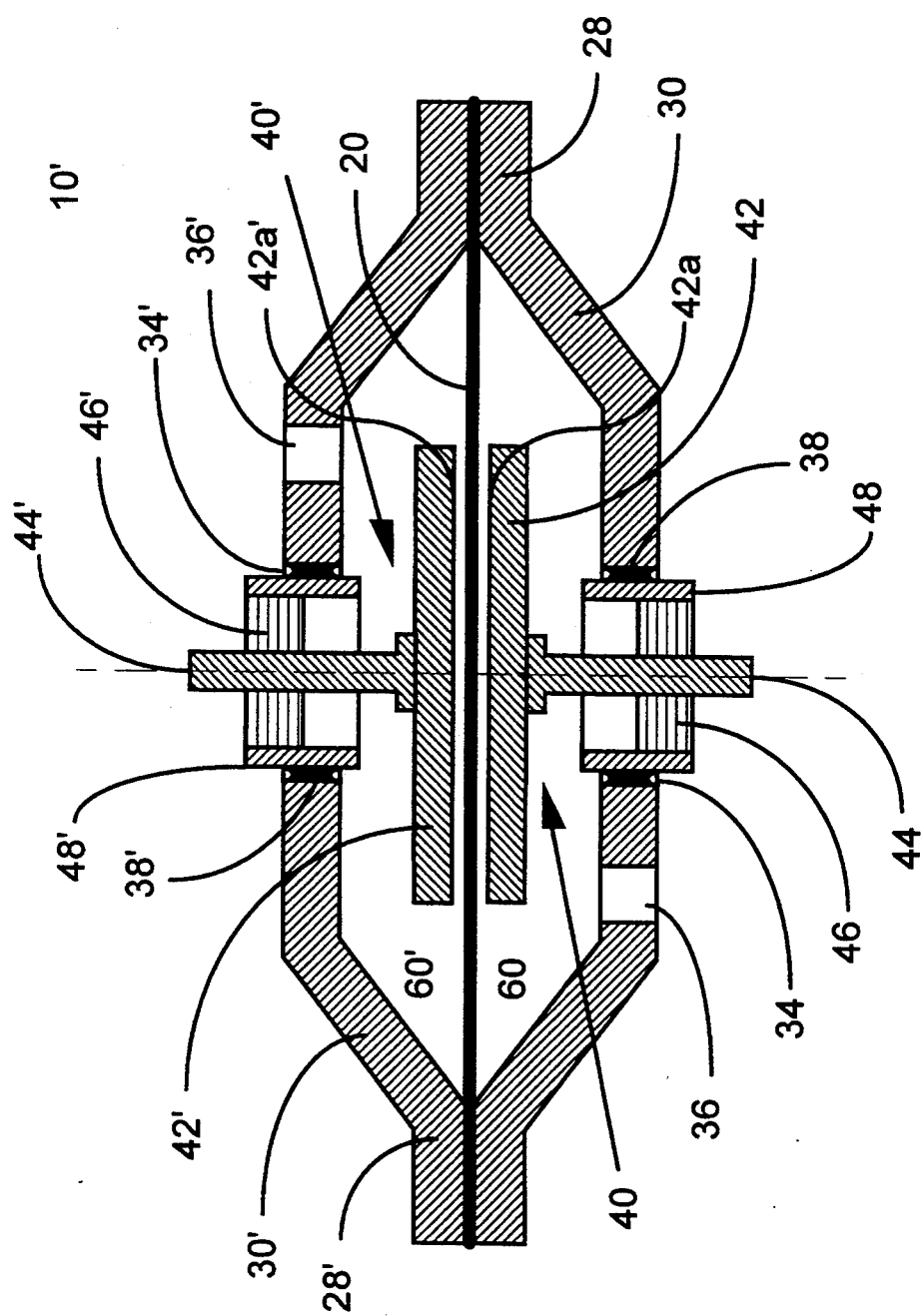
FIG. 4A shows a sectional view of a first alternative embodiment of the invention.

FIG. 4A shows a sensor 10′ that is similar to sensor 10 of FIGS. 2A–2D but where the housing 50 has been replaced by an assembly similar to base member 30 and electrode assembly 40. In FIG. 4A, elements corresponding to elements in FIG. 2 are denoted by the same and primed (′) reference designations. The sensor 10′ of FIG. 4A operates in a similar manner to the system 10 but in a "push-pull" configuration; more particularly, the distance between the fixed planar electrode surfaces 42a and 42a′ is fixed (D) so that d+d′=D. Such push-pull sensors are useful in known prior art circuit configurations, for example, as exemplified by those set forth in U.S. Pat. No. 4,386,312 and 4,054,833, assigned to the assignee of the present invention.

Figure 4B:
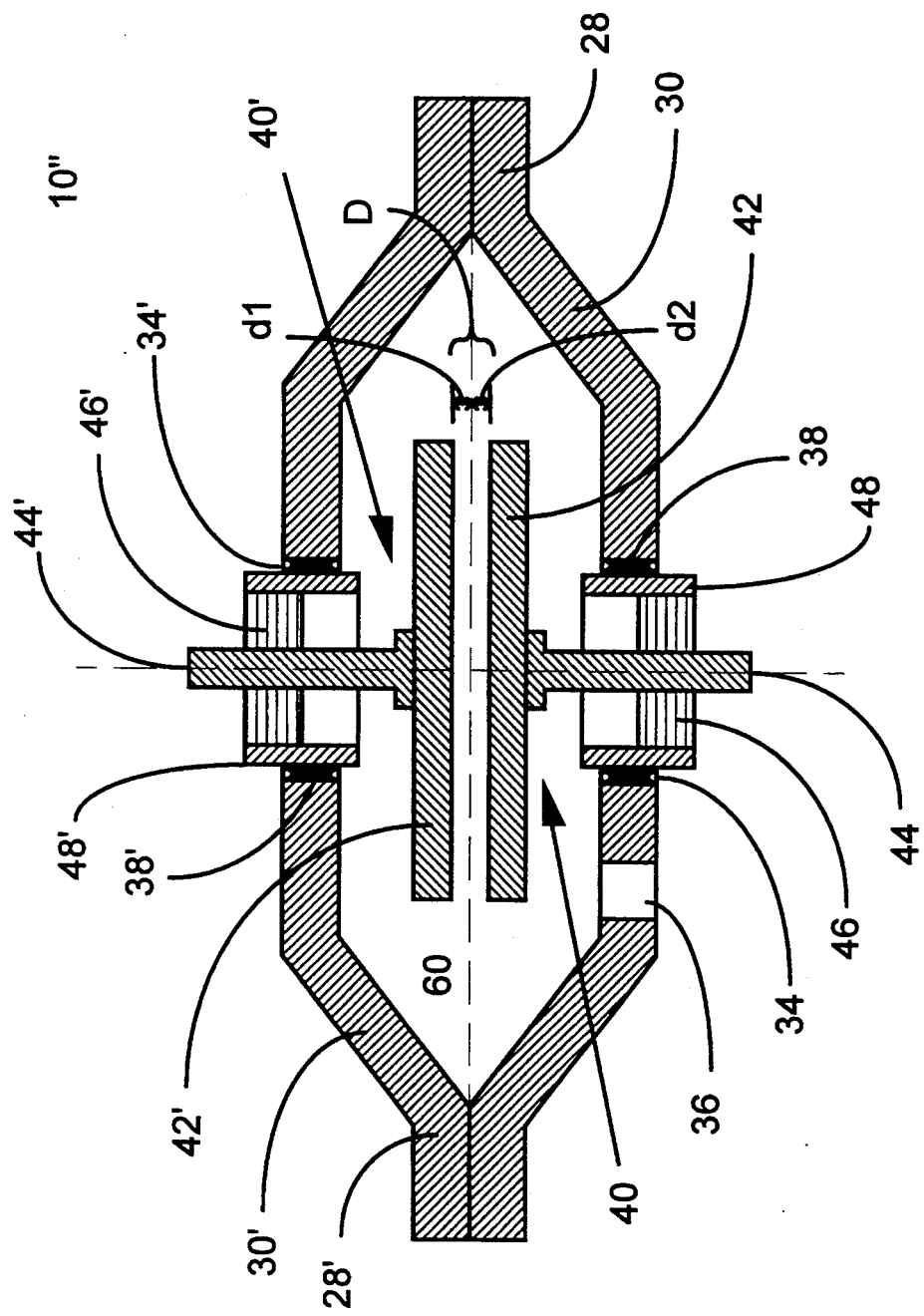
FIG. 4B shows a sectional view of a second alternative embodiment of the invention.

FIG. 4B shows a sensor 10″ that is similar to sensor 10′ of FIG. 4A except that there is no diaphragm between the upper base member 30′ and lower base member 30. The upper 30′ and lower 30 base members are joined together to form a sealed chamber 60. In this embodiment, either or both of the base members are substantially deformable to permit changes in the gap between upper electrode 40′ and lower electrode 40 to correspond to differences between the pressure inside sealed chamber 60 and the outside the chamber. In one embodiment, the chamber 60 may be evacuated through pressure port 36, which is then sealed. This configuration is useful for measuring absolute pressure, including, for example, barometric pressure.

In addition to the structure of the sensors 10, 10′ and 10″ as described above, an electronic circuit may be integrally included with each sensor. The circuit may be positioned on a printed circuit board which is supported by base member 30 or by an external housing. The circuit may be connected to electrode 42 through support element 44 via a spring contact extending from the circuit board.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A capacitive pressure sensor comprising:
   A) a housing disposed about a central axis, said housing including
      i) a first concave base member disposed symmetrically about said central axis and having a peripheral rim disposed in a first plane, said first plane being substantially perpendicular to said central axis, said first concave base member having a first aperture extending about said central axis; and
      ii) a second concave base member opposite said first concave base member disposed symmetrically about said central axis and having a peripheral rim disposed in said first plane, said peripheral rim of said second concave base member being fixedly coupled to said peripheral rim of said first concave base member;
   B) a diaphragm having peripheral portion fixedly coupled to at least one of said peripheral rim of said first base member and said peripheral rim of said second base member;
   C) a pre-assembled first electrode assembly including
      i) a first electrode having a first electrically conductive surface;
      ii) a first electrode support fixedly coupled to said first electrode and extending along a first electrode axis, said first electrode axis extending substantially transverse to said first electrically conductive surface;
      iii) a first tubular collar substantially concentrically disposed about said first electrode support;
      iv) a dielectric material rigidly coupling said first electrode support to said first tubular collar; and
   said first electrode assembly being rigidly coupled to said first concave base member according to the following sequential steps:
      1) positioning said first tubular collar in said first aperture, whereby said first electrically conductive surface is uniformly spaced apart from said first plane by a predetermined distance;
      2) rigidly coupling said first tubular collar to said first concave base member maintaining said first electrically conductive surface opposite said first plane and uniformly spaced apart therefrom by said predetermined distance.

2. A capacitive pressure sensor according to claim 1, wherein said first electrically conductive surface is uniformly spaced apart from said diaphragm by a nominal gap, d.

3. A capacitive pressure sensor according to claim 1, wherein step 2 includes the sub-steps of
   2a) providing a formable filler material between said first tubular collar and said first concave base member, and
   2b) hardening said filler material whereby said filler material rigidly couples said first tubular collar to first concave base member.

4. A capacitive pressure sensor according to claim 1, wherein said dielectric material contains a glass material.

5. A capacitive pressure sensor according to claim 1, wherein said first electrically conductive surface is substantially planar.

6. A capacitive pressure sensor according to claim 5, wherein said first electrically conductive surface includes a central recessed portion separated from said first plane by a distance greater than said predetermined distance.

7. A capacitive pressure sensor according to claim 1, wherein said first electrically conductive surface is substantially concave.

8. A capacitive pressure sensor according to claim 1, wherein said first electrode support is fusion welded to said first electrode.

9. A capacitive pressure sensor according to claim 1, wherein said first electrode assembly is formed by the steps of:
   A) fixedly coupling said first electrode support to said first electrode, whereby said first electrode axis extends substantially transverse to said first electrically conductive surface;
   B) positioning said first tubular collar substantially concentrically about said first electrode support, whereby an interior surface of said first tubular collar is opposite and substantially uniformly spaced apart from an exterior surface of said first electrode support;

C) rigidly coupling said interior surface of said first tubular collar and said exterior surface of said first electrode support to a substantially rigid dielectric material.

10. A capacitive pressure sensor comprising:
A) a housing disposed about a central axis, said housing including
  i) a first concave base member disposed symmetrically about said central axis and having a peripheral rim disposed in a first plane, said first plane being substantially perpendicular to said central axis, said first concave base member having an aperture extending about said central axis; and
  ii) a second concave base member opposite said first concave base member disposed symmetrically about said central axis and having a peripheral rim disposed in said first plane, said second concave base member having an aperture extending about said central axis, said peripheral rim of said second concave base member being fixedly coupled to said peripheral rim of said first concave base member;
B) a pre-assembled first electrode assembly including
  i) a first electrode having a first electrically conductive surface;
  ii) a first electrode support fixedly coupled to said first electrode and extending along a first electrode axis, said first electrode axis extending substantially transverse to said first electrically conductive surface;
  iii) a first tubular collar substantially concentrically disposed about said first electrode support;
  iv) a first dielectric material rigidly coupling said first electrode support to said first tubular collar; and
said first electrode assembly being rigidly coupled to said first concave base member according to the following sequential steps:
  1) positioning said first tubular collar in said aperture of said first concave base member, whereby said first electrically conductive surface is uniformly spaced apart from said first plane by a first predetermined distance;
  2) rigidly coupling said first tubular collar to said first concave base member maintaining said first electrically conductive surface opposite said first plane and uniformly spaced apart therefrom by said first predetermined distance;
C) a pre-assembled second electrode assembly including
  i) a second electrode having a second electrically conductive surface;
  ii) a second electrode support fixedly coupled to said second electrode and extending along a second electrode axis, said second electrode axis extending substantially transverse to said second electrically conductive surface;
  iii) a second tubular collar substantially concentrically disposed about said second electrode support;
  iv) a second dielectric material rigidly coupling said second electrode support to said second tubular collar; and
said second electrode assembly being rigidly coupled to said second concave base member according to the following sequential steps:
  3) positioning said second tubular collar in said aperture of said second concave base member, whereby said second electrically conductive surface is uniformly spaced apart from said first plane by a second predetermined distance;
  4) rigidly coupling said second tubular collar to said second concave base member maintaining said second electrically conductive surface opposite said first plane and uniformly spaced apart therefrom by said second predetermined distance.

11. A capacitive pressure sensor according to claim 10, wherein said first electrically conductive surface is uniformly spaced apart from said second electrically conductive surface by a nominal gap, D.

12. A capacitive pressure sensor according to claim 10, further comprising
a diaphragm having peripheral portion fixedly coupled to at least one of said peripheral rim of said first base member and said peripheral rim of said second base member.

13. A capacitive pressure sensor according to claim 12, wherein said first electrically conductive surface is uniformly spaced apart from said diaphragm by a nominal gap, d.

14. A capacitive pressure sensor according to claim 12, wherein said second electrically conductive surface is uniformly spaced apart from said diaphragm by a nominal gap, d'.

15. A capacitive pressure sensor according to claim 10, wherein step 2 includes the sub-steps of
  2a) providing a formable filler material between said first tubular collar and said first concave base member, and
  2b) hardening said filler material whereby said filler material rigidly couples said first tubular collar to first concave base member.

16. A capacitive pressure sensor according to claim 10, wherein step 4 includes the sub-steps of
  4a) providing a formable filler material between said second tubular collar and said second concave base member, and
  4b) hardening said filler material whereby said filler material rigidly coupling said second tubular collar to second concave base member.

17. A capacitive pressure sensor according to claim 10, wherein said first dielectric material contains a glass material.

18. A capacitive pressure sensor according to claim 10, wherein said second dielectric material contains a glass material.

19. A capacitive pressure sensor according to claim 10, wherein said first electrically conductive surface is substantially planar.

20. A capacitive pressure sensor according to claim 19, wherein said first electrically conductive surface includes a central recessed portion separated from said first plane by a distance greater than said first predetermined distance.

21. A capacitive pressure sensor according to claim 10, wherein said second electrically conductive surface is substantially planar.

22. A capacitive pressure sensor according to claim 21, wherein said second electrically conductive surface includes a central recessed portion separated from said first plane by a distance greater than said second predetermined distance.

23. A capacitive pressure sensor according to claim 10, wherein said first electrically conductive surface is substantially concave.

24. A capacitive pressure sensor according to claim 10, wherein said second electrically conductive surface is substantially concave.

25. A capacitive pressure sensor according to claim 10, wherein said first electrode support is fusion welded to said first electrode.

26. A capacitive pressure sensor according to claim 10, wherein said second electrode support is fusion welded to said second electrode.

27. A capacitive pressure sensor according to claim 10, wherein said first electrode assembly is formed by the steps of:
  A) fixedly coupling said first electrode support to said first electrode, whereby said first electrode axis extends substantially transverse to said first electrically conductive surface;
  B) positioning said first tubular collar substantially concentrically about said first electrode support, whereby an interior surface of said first tubular collar is opposite and substantially uniformly spaced apart from an exterior surface of said first electrode support;
  C) rigidly coupling said interior surface of said first tubular collar and said exterior surface of said first electrode support to a substantially rigid dielectric material.

28. A capacitive pressure sensor according to claim 10, wherein said second electrode assembly is formed by the steps of:
  A) fixedly coupling said second electrode support to said second electrode, whereby said second electrode axis extends substantially transverse to said second electrically conductive surface;
  B) positioning said second tubular collar substantially concentrically about said second electrode support, whereby an interior surface of said second tubular collar is opposite and substantially uniformly spaced apart from an exterior surface of said second electrode support;
  C) rigidly coupling said interior surface of said second tubular collar and said exterior surface of said second electrode support to a substantially rigid dielectric material.

29. A capacitive pressure sensor according to claim 10, wherein said first base member and said second base member form a hermetically sealed chamber having a predetermined pressure.

30. A capacitive pressure sensor comprising:
  A) a housing disposed about a central axis, said housing including
    i) a first concave base member disposed symmetrically about said central axis and having a peripheral rim disposed in a first plane, said first plane being substantially perpendicular to said central axis, said first concave base member having a first aperture extending about said central axis; and
    ii) a second concave base member opposite said first concave base member disposed symmetrically about said central axis and having a peripheral rim disposed in said first plane, peripheral rim of said second concave base member being fixedly coupled to peripheral rim of said first concave base member;
  B) a diaphragm having peripheral portion fixedly coupled to at least one of said peripheral rim of said first base member and said peripheral rim of said second base member;
  C) a pre-assembled first electrode assembly and associated coupling means including
    i) a first electrode having a first electrically conductive surface;
    ii) a first electrode support fixedly coupled to said first electrode and extending along a first electrode axis, said first electrode axis extending substantially transverse to said first electrically conductive surface, said first electrode support having an outer surface;
    iii) a first tubular collar substantially concentrically disposed about said first electrode support, said first tubular collar having an outer surface and an inner surface;
    iv) a dielectric material rigidly coupling said outer surface of the first electrode support to the inner surface of said first tubular collar;
    iv) coupling means for rigidly coupling the outer surface of said first tubular collar to said first concave base member at said first aperture whereby said first tubular collar extends through said first aperture and said first electrically conductive surface is opposite said first plane and uniformly separated therefrom by a predetermined distance;
  whereby said first electrode support is rigidly coupled to said first concave base member at said first aperture solely by way of said dielectric material, said collar and said coupling means.

31. A capacitive pressure sensor according to claim 30, wherein said first electrically conductive surface is uniformly spaced apart from said diaphragm by a nominal gap, d.

32. A capacitive pressure sensor according to claim 30, wherein said coupling means includes a formable filler material disposed between said first tubular collar and said first concave base member for rigidly coupling said first tubular collar to said first concave base member.

33. A capacitive pressure sensor according to claim 30, wherein said dielectric material contains a glass material.

34. A capacitive pressure sensor according to claim 30, wherein said first electrically conductive surface is substantially planar.

35. A capacitive pressure sensor according to claim 34, wherein said first electrically conductive surface includes a central recessed portion separated from said first plane by a distance greater than said predetermined distance.

36. A capacitive pressure sensor according to claim 30, wherein said first electrically conductive surface is substantially concave.

37. A capacitive pressure sensor according to claim 30, wherein said first electrode support is fusion welded to said first electrode.

38. A capacitive pressure sensor comprising:
  A) a housing disposed about a central axis, said housing including
    i) a first concave base member disposed symmetrically about said central axis and having a peripheral rim disposed in a first plane, said first plane being substantially perpendicular to said central axis, said first concave base member having an aperture extending about said central axis; and
    ii) a second concave base member opposite said first concave base member disposed symmetrically about said central axis and having a peripheral rim disposed in said first plane, said second concave base member having an aperture extending about said central axis, said peripheral rim of said second concave base member being fixedly coupled to said peripheral rim of said first concave base member;

B) a pre-assembled first electrode assembly and associated first coupling means including
   i) a first electrode having a first electrically conductive surface;
   ii) a first electrode support fixedly coupled to said first electrode and extending along a first electrode axis, said first electrode axis extending substantially transverse to said first electrically conductive surface, said first electrode support having an outer surface;
   iii) a first tubular collar substantially concentrically disposed about said first electrode support, said first tubular collar having an outer surface and an inner surface;
   iv) a dielectric material rigidly coupling said outer surface of the first electrode support to the inner surface of said first tubular collar;
   iv) first coupling means for rigidly coupling the outer surface of said first tubular collar to said first concave base member at said aperture of said first concave base member whereby said first tubular collar extends through said aperture of said first concave base member and said first electrically conductive surface is opposite said first plane and uniformly separated therefrom by a first predetermined distance;
whereby said first electrode support is rigidly coupled to said first concave base member at said aperture of said first concave base member solely by way of said first dielectric material, said first tubular collar and said first coupling means, therefore permitting substantially no net relative movement of said first electrode support with respect to said first tubular collar as a result of thermal expansion or contraction;

C) a second electrode assembly and associated second coupling means including
   i) a second electrode having a second electrically conductive surface;
   ii) a second electrode support fixedly coupled to said second electrode and extending along a second electrode axis, said second electrode axis extending substantially transverse to said second electrically conductive surface, said second electrode support having an outer surface;
   iii) a second tubular collar substantially concentrically disposed about said second electrode support, said second tubular collar having an outer surface and an inner surface;
   iv) a second dielectric material rigidly coupling said outer surface of the second electrode support to the inner surface of said second tubular collar;
   iv) second coupling means for rigidly coupling the outer surface of said second tubular collar to said second concave base member at said aperture of said second concave base member whereby said second tubular collar extends through said aperture of said second concave base member and said second electrically conductive surface is opposite said first plane and uniformly separated therefrom by a second predetermined distance;
whereby said second electrode support is rigidly coupled to said second concave base member at said aperture of said second concave base member solely by way of said dielectric material, said tubular collar and said second coupling means.

39. A capacitive pressure sensor according to claim 38, wherein said first electrically conductive surface is uniformly spaced apart from said second electrically conductive surface by a nominal gap, D.

40. A capacitive pressure sensor according to claim 38, further comprising a diaphragm having peripheral portion fixedly coupled to at least one of said peripheral rim of said first base member and said peripheral rim of said second base member.

41. A capacitive pressure sensor according to claim 40, wherein said first electrically conductive surface is uniformly spaced apart from said diaphragm by a nominal gap, d.

42. A capacitive pressure sensor according to claim 40, wherein said first electrically conductive surface is uniformly spaced apart from said diaphragm by a nominal gap, d'.

43. A capacitive pressure sensor according to claim 38, wherein said first coupling means includes a formable filler material disposed between said first tubular collar and said first concave base member for rigidly coupling said first tubular collar to said first concave base member.

44. A capacitive pressure sensor according to claim 38, wherein said second coupling means includes a formable filler material disposed between said second tubular collar and said second concave base member for rigidly coupling said second tubular collar to said second concave base member.

45. A capacitive pressure sensor according to claim 38, wherein said first dielectric material contains a glass material.

46. A capacitive pressure sensor according to claim 38, wherein said second dielectric material contains a glass material.

47. A capacitive pressure sensor according to claim 38, wherein said first electrically conductive surface is substantially planar.

48. A capacitive pressure sensor according to claim 47, wherein said first electrically conductive surface includes a central recessed portion separated from said first plane by a distance greater than nominal gap, d.

49. A capacitive pressure sensor according to claim 38, wherein said second electrically conductive surface is substantially planar.

50. A capacitive pressure sensor according to claim 49, wherein said second electrically conductive surface includes a central recessed portion separated from said first plane by a distance greater than nominal gap, d'.

51. A capacitive pressure sensor according to claim 38, wherein said first electrically conductive surface is substantially concave.

52. A capacitive pressure sensor according to claim 38, wherein said second electrically conductive surface is substantially concave.

53. A capacitive pressure sensor according to claim 38, wherein said first electrode support is fusion welded to said first electrode.

54. A capacitive pressure sensor according to claim 38, wherein said second electrode support is fusion welded to said second electrode.

55. A capacitive pressure sensor according to claim 38, wherein said first base member and said second base member form a hermetically sealed chamber having a predetermined pressure.

* * * * *